No. 650,024. Patented May 22, 1900.
N. A. RIGGINS.
PLANT PROTECTOR.
(Application filed Feb. 6, 1900.)
(No Model.)
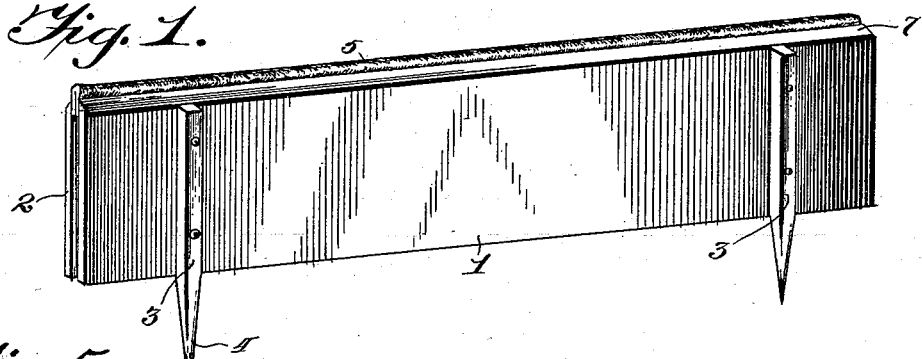
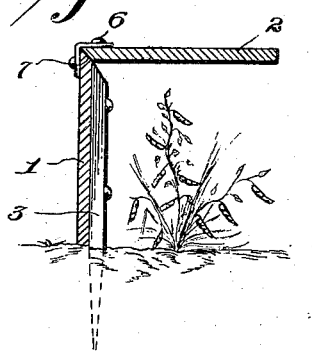
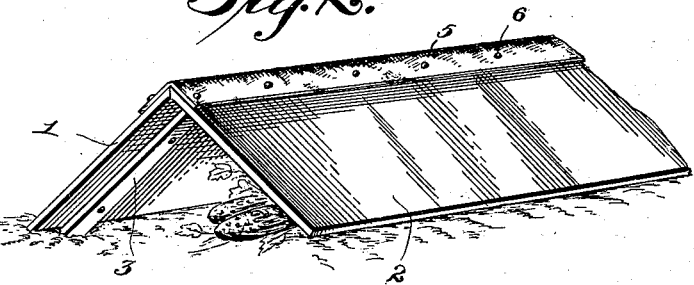
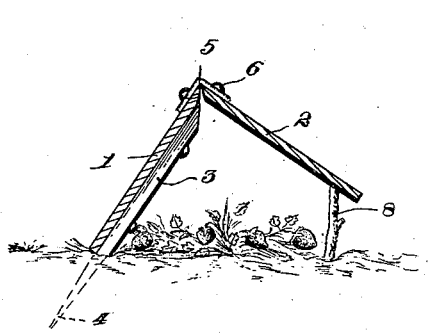
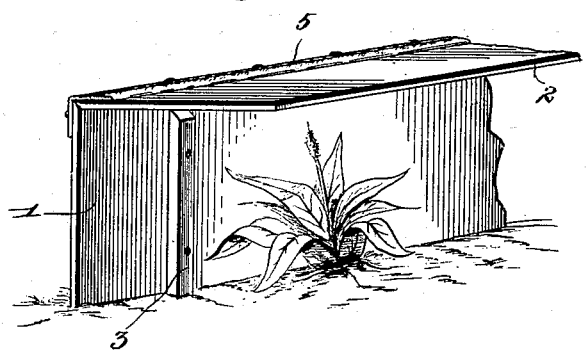
Witnesses
N. A. Riggins, Inventor
By his Attorneys,

UNITED STATES PATENT OFFICE.

NORMAN ALPHEUS RIGGINS, OF LAKELAND, FLORIDA.

PLANT-PROTECTOR.

SPECIFICATION forming part of Letters Patent No. 650,024, dated May 22, 1900.

Application filed February 6, 1900. Serial No. 4,224. (No model.)

*To all whom it may concern:*

Be it known that I, NORMAN ALPHEUS RIGGINS, a citizen of the United States, residing at Lakeland, in the county of Polk and State of Florida, have invented a new and useful Plant-Protector, of which the following is a specification.

This invention relates to plant-protectors, and has for its object to provide an improved device of this character which is adjustable, so as to form a shield against winds and beating rains and also to form a shade, so as to protect the plants against the fierce rays of the sun, while at the same time to afford the required ventilation. It is furthermore designed to arrange the device so as to reflect the rays of the sun upon the plants, and thereby to increase the effect of such rays when the sun is partly covered by clouds.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of a plant-protector constructed in accordance with the present invention and in position to form a shield against wind and at the same time to expose the plant to the sun. Fig. 2 is a detail perspective view showing the device as adjusted to form a protection against beating rains. Fig. 3 is a transverse sectional view illustrating an adjusted position of the device to protect the plants against beating rains and to afford an increased ventilation. Fig. 4 is a detail perspective view illustrating the device as adjusted to shield the plants from the direct action of the rays of the sun. Fig. 5 is a transverse sectional view of Fig. 4.

Corresponding parts in the several figures of the drawings are designated by like characters of reference.

Referring to the accompanying drawings, it will be seen that the present device comprises the opposite members 1 and 2, each of which is preferably formed from a single board or plank of suitable length to protect one or more plants, as may be desired. It will of course be understood that each of these members may comprise a frame which is covered with paper, cloth, or other suitable material without departing from the purpose of the invention.

As clearly indicated in the drawings, the member 1 is designed to be the fixed member and is provided with suitable pins or standards 3, which are secured to the inner side of the member and have their pointed ends 4 projecting at the lower edge of the member, so as to be driven into the ground and thereby support the device. The other member 2 is the movable member and with the exception of the standards is a duplicate of the fixed member. The inner edges of these members are hingedly connected by means of a strip of canvas or other suitably strong and flexible material 5, which embraces the outer sides of the members and is connected thereto by means of suitable fastenings 6. Although this is the preferred manner of hingedly connecting the members, it will of course be understood that any other form of hinge may be employed so long as the pivot thereof is located at the outer sides of the members.

An important object of the present invention is to hold the movable member in an angularly-disposed position with respect to the fixed member, so as to form a shield against the rays of the sun, and without the employment of separate supports or braces for the movable member. To carry out this design, the inner hingedly-connected edges of the members are mitered, as indicated at 7, so that these beveled edges may abut and form a stop to support the movable member in an angular position at the inner side of the fixed member, as best shown in Fig. 5 of the drawings. It will now be apparent that it is important to have the pivot of the hinged connection at the outer sides of the members, so that the latter may not swing together in their angularly related and operative positions. The angle of the beveled abutting edges of the hingedly-connected members may be varied so as to accommodate the device to the conditions governing any particular application of the protector.

In the application of the device to protect the plants against a wind and at the same time to expose the same to the sun, the protector is located at the windward side of the plants and the movable member 2 folded over against the outer side of the fixed member, as illustrated in Fig. 1 of the drawings, said fixed member being preferably in an upright position, although it may be inclined, if desired. This folding of the members back to back is accomplished by reason of the fact that the pivot of the hinged connection of the members is located at the outer sides of the latter. In Fig. 2 the lower edges of both members engage the ground, so as to form an A-shaped tent structure to entirely cover the plant and protect the latter against beating rains and frost. In some instances it may be desired to elevate the movable member slightly above the ground, so as to afford a greater ventilation, and this object may be accomplished by means of one or more short stakes, which are driven into the ground so as to support the free edge of the movable member, as indicated in Fig. 3 of the drawings. To form a shade for protecting the plants against the direct action of the rays of the sun, the device is adjusted as shown in Figs. 4 and 5 of the drawings, the fixed member assuming a substantially-upright position with the movable member supported at an angle thereto by means of the abutting mitered edges thereof, so that the movable member forms a cover for the plant and the latter is exposed to the free circulation of air.

From the foregoing description it will be apparent that the present invention provides a light and durable protector, which may be readily transported from place to place as required for use, and may be readily transferred from one side of the plants to the other and also adjusted to meet the existing conditions of any particular application.

In severe weather the contiguous ends of adjacent protectors may be brought into contact or overlapped, so as to form a continuous device, and the opposite open ends may be closed by a board or a few shovelfuls of earth. Also the entire protector may be covered with earth, so as to effectually protect the plants against severe frosts, and at the same time the plants are not subjected to the weight of the earth nor damaged thereby in any manner whatsoever.

Having described the invention, I claim—

1. A plant-protector, comprising a pair of hingedly-connected members, one of the latter abutting upon the other when brought to a certain angle therewith, and thereby supported in such position.

2. A plant-protector, comprising a pair of hingedly-connected members, which have their adjacent edges mitered, the mitered edge of one of the members abutting upon the mitered edge of the other member when brought to a certain angle therewith, and thereby supported in such position.

3. A plant-protector, comprising a pair of members, which have their adjacent edge portions hingedly connected by an outer flexible hinge-strap embracing the outer sides of the adjacent portions of the members, and also closing the space between the hinged portions, the hinged edge of one of the members abutting upon the other when brought to a certain angle therewith, and thereby supported in such position.

4. A plant-protector, comprising a fixed member, having supporting-legs projecting at the lower edge thereof, the upper edge of the member being mitered inwardly and downwardly, a second movable member having its upper edge parallel with the upper edge of the fixed member, and mitered to correspond therewith, and a hinged connection for the mitered edges of the members, the mitered edge of the movable member abutting upon the other when brought to a certain angle therewith, and thereby supported in such position.

In testimony that I claim the foregoing as my own I have hereto affixed my signature in the presence of two witnesses.

NORMAN ALPHEUS RIGGINS.

Witnesses:
C. W. WAGGONER,
C. G. ARENDELL.